United States Patent
Schlüter

(10) Patent No.: US 7,347,510 B2
(45) Date of Patent: Mar. 25, 2008

(54) BRAKING FORCE GENERATOR FOR A HYDRAULIC VEHICLE BRAKING SYSTEM

(75) Inventor: Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/497,647

(22) Filed: Aug. 2, 2006

(65) Prior Publication Data

US 2007/0001508 A1   Jan. 4, 2007

Related U.S. Application Data

(63) Continuation of application No. PCT/EP2005/000538, filed on Jan. 20, 2005.

(30) Foreign Application Priority Data

Feb. 2, 2004  (DE) ............... 10 2004 005 107
Jun. 23, 2004 (DE) ............... 20 2004 009 835 U

(51) Int. Cl.
  *B60T 8/44* (2006.01)
(52) U.S. Cl. .................................. 303/114.1
(58) Field of Classification Search ........ 188/358–360;
     303/114.1, 114.3; 91/367–376 R; 60/533
   See application file for complete search history.

(56) References Cited

U.S. PATENT DOCUMENTS

| 5,493,946 | A | 2/1996 | Schlüter | |
|---|---|---|---|---|
| 6,203,118 | B1 | 3/2001 | Takayama et al. | |
| 6,272,969 | B1 * | 8/2001 | Zeuner et al. | ............... 91/367 |
| 6,494,546 | B1 | 12/2002 | Feigel | |
| 6,554,373 | B1 | 4/2003 | Bill | |
| 6,652,040 | B2 * | 11/2003 | Oka et al. | ............... 303/114.1 |
| 2001/0004833 | A1 * | 6/2001 | Schluter | ............... 60/533 |
| 2002/0121187 | A1 * | 9/2002 | Schluter | ............... 91/376 R |
| 2006/0043788 | A1 * | 3/2006 | Schluter | ............... 303/113.4 |
| 2006/0273659 | A1 * | 12/2006 | Schluter | ............... 303/191 |

FOREIGN PATENT DOCUMENTS

DE    41 16 372 A1    11/1992

(Continued)

*Primary Examiner*—Chris Schwartz
(74) *Attorney, Agent, or Firm*—MacMillan, Sobanski & Todd, LLC

(57) ABSTRACT

In a brake force generator (10) for a vehicle hydraulic brake system having a force input element (14), which is connectable or connected to a brake pedal (P) and displaceable in a base housing of the brake force generator (10), a master cylinder, in which a primary piston (64) is displaceably guided for generating a hydraulic brake pressure, a pedal counterforce simulating device (105) connected to the force input element (14), a pedal actuation detecting device (150) for detecting a pedal actuation, and an actuating force generating device for exerting an actuating force on the primary piston (64), it is provided that the actuating force generating device comprises a control valve (22), a chamber arrangement (16) and an electromagnetic actuator (48), wherein the chamber arrangement (16) is designed with a vacuum chamber (30) and a working chamber (32), which is separated from the vacuum chamber (30) by a movable wall (28) and is fluidically connectable to the vacuum chamber (30) by the control valve (22), and wherein the control valve (22) may be activated in accordance with the detected pedal actuation.

34 Claims, 9 Drawing Sheets

FOREIGN PATENT DOCUMENTS

| | | |
|---|---:|---|
| DE | 44 05 092 C1 | 12/1994 |
| DE | 44 10 699 A1 | 10/1995 |
| DE | 198 45 052 A1 | 4/1999 |
| DE | 198 17 190 C1 | 7/1999 |
| DE | 100 57 557 A1 | 12/2001 |
| EP | 1 070 006 B1 | 1/2001 |
| GB | 2 193 546 A | 2/1988 |
| WO | WO 2004/005095 A1 | 1/2004 |

* cited by examiner

BRAKING FORCE GENERATOR FOR A HYDRAULIC VEHICLE BRAKING SYSTEM

CROSS-REFERENCE TO RELATED APPLICATIONS

This application is a continuation of International Application No. PCT/EP2005/000538 filed Jan. 20, 2005, the disclosures of which are incorporated herein by reference, and which claimed priority to German Patent Application No. 10 2004 005 107.0 filed Feb. 2, 2004 and German Patent Application No. 20 2004 009 835.0 filed Jun. 23, 2004, the disclosures of which are incorporated herein by reference.

BACKGROUND OF THE INVENTION

The present invention relates to a brake force generator having a force input element, which is connectable or connected to a brake pedal and displaceable in a base housing of the brake force generator, a master cylinder, in which a primary piston is displaceably guided, wherein the primary piston with the master cylinder delimits a primary pressure chamber for generating a hydraulic brake pressure, a pedal counterforce simulating device connectable to the force input element, a pedal actuation detecting device for detecting a pedal actuation, and an actuating force generating device for generating an actuating force that acts upon the primary piston.

In currently conventional brake systems, the hydraulic brake pressure required for acting upon the wheel brake of the vehicle is generated predominantly by means of a master cylinder. For this purpose, it is necessary to initiate an actuating force upon the said master cylinder that is generated in response to an actuation of the brake pedal by the vehicle driver. For improved actuating comfort, the actual brake pedal force is usually increased by a predetermined percentage by means of a brake booster so that the necessary brake pedal actuating forces for a desired vehicle deceleration may be kept low enough to allow each driver to brake the vehicle adequately without exertion. Such a brake system with brake booster is known for example from DE 44 05 092, and corresponding U.S. Pat. No. 5,493,946, both of which are incorporated by reference herein.

A disadvantageous effect of these brake systems is that the driver by virtue of his actuating action at the brake pedal always influences the hydraulic pressure at the wheel brakes. So long as this assists the braking situation, it is not a problem. However, as soon as the driver reacts incorrectly to the actual braking situation, for example by adjusting too much or too little brake pressure, the braking performance, in particular the braking distance and the stability of the vehicle may be adversely affected, which in the worst-case scenario may lead to an accident.

Modern vehicle control systems (ABS, ESP, TC etc.) are now able to determine from the instantaneous driving state of the vehicle the optimum braking power requirement within the physical limits and hence to optimize a braking operation. A prerequisite of this is, however, to prevent the previously mentioned direct influence of the driver on the brake pressure. Furthermore, it has meanwhile begun to be regarded as unacceptable that the driver senses the action of the vehicle control system at the brake pedal, for example a repeated shaking at the brake pedal upon activation of the ABS.

In order to meet these requirements associated with vehicle control systems, in modern brake systems the brake pedal is already uncoupled from the brake force generation, in which case the brake pedal actuation is used merely to communicate the deceleration request of the driver. The actual brake force generation, for example for actuating the master cylinder, is then effected by means of a separate brake force generator, namely solely on the basis of control data of an electronic control unit. It is therefore possible to check in advance whether or not, for example, the desired vehicle deceleration would exceed the instantaneously effective physical limits in respect of braking distance and vehicle stability that are determined by the vehicle control systems (ABS, ESP, TC etc.). At the same time, the control unit may of course also compensate an inadequate deceleration adjusted by the driver in order to minimize the stopping distance in emergency situations through adjustment of a higher brake pressure. Such a system is described for example in the generic background art according to EP 1 070 006. It has however emerged that such brake systems are relatively cost-intensive to manufacture and entail a considerable equipment outlay in order to guarantee reliable brake operation also in the event of failure of the brake force generating means.

BRIEF SUMMARY OF THE INVENTION

The present invention generally provides a brake force generator of the initially described type, which, while being of a relatively simple and economical design, is extremely reliable and guarantees a reliable braking effect even in the event of the failure of individual components.

This embodiment includes a brake force generator, which has the initially described features and in which it is further provided that the actuating force generating device comprises a control valve, a chamber arrangement and an electromagnetic actuator, wherein the chamber arrangement is designed with a vacuum chamber and a working chamber, which is separated from the vacuum chamber by a movable wall and is fluidically connectable to the vacuum chamber by the control valve, and wherein the control valve may be activated in accordance with the detected pedal actuation by the electromagnetic actuator in order to achieve a pressure difference between working chamber and vacuum chamber that determines the actuating force.

With the brake force generator according to the present invention, in a normal operating situation the intensity of the brake pedal actuation defined by a driver of the vehicle via the force input element is accordingly detected and, without utilizing the pedal actuating force exerted on the brake pedal by the driver, an actuating force is exerted on the primary piston solely by means of the actuating force generating device. Just as in the initially mentioned background art according to EP 1 070 006, according to the invention the actuating force exerted on the primary piston in the normal operating situation is generated mechanically uncoupled from the pedal actuating force exerted on the force input element. However, the actuating force generating device used for this purpose in the context of the invention is not designed as a separate hydraulic system, which would lead to a considerable additional technical outlay and, in addition to the extra costs associated therewith, also to an increased susceptibility to faults. Rather, the brake force generator according to the invention is realized by means of a chamber arrangement, such as is used also in conventional pneumatic brake boosters to mechanically boost the pedal actuating force. The applicant has recognized that the technically perfected and economically available principle of a pneumatic brake booster may also be utilized to achieve an actuating force generation that is entirely uncoupled from the pedal actuation. For this purpose, in accordance with the intensity of the brake pedal actuation the chamber arrangement is activated by the control valve in order thereby to adjust a pressure difference between vacuum chamber and working chamber for generating an actuating force acting upon the primary piston in accordance with the driver request communicated by the pedal actuation. This pressure difference subsequently leads to a displacement of the movable wall and hence to a displacement of the primary piston.

In order to be able to monitor the mode of operation of the brake force generator according to the invention and to provide a parameter for feedback of the response characteristic of the brake force generator according to the invention in a closed control loop, a development of the invention provides that the present position of the movable wall is detected by means of a position sensor. In said case, the position sensor may be of an inductive or mechanical design. A simple, economical and yet reliable development arises for example when the position sensor is designed with a feeler which rests under bias against the movable wall and may detect the position thereof in the event of a displacement.

With regard to the pedal actuation detecting device, it may be provided that this comprises a sensor for detecting an actual deflection of the brake pedal, in particular an angle-of-rotation sensor disposed at an axis of rotation of the brake pedal. It is however equally possible to detect the pedal actuation by means of a differently designed sensor, for example from the translatory movement of the force input element or from a pressure load arising within the force input element.

As is already known from conventional pneumatic brake boosters, in the brake force generator according to the invention it may be provided that the vacuum chamber for generating a vacuum is fluidically connected to the intake tract of an internal combustion engine or to a vacuum pump.

As already mentioned above, unlike conventional brake boosters, the pedal actuating force in the solution according to the invention in a normal braking situation, i.e. in the fully functional state of the brake system, is not transmitted to the primary piston. Rather, it is necessary to generate an actuating force by means of the electromagnetic actuator. The actuator may therefore take the form of a linear drive or a rotary drive, the rotational movement of which is converted to a translatory movement by means a gear arrangement, for example a ball screw drive. A preferred embodiment of the invention provides that the electromagnetic actuator comprises a coil fastened to the control valve housing as well as a magnetic armature displaceable by means of the coil relative to the coil. With this constructional variant, it is possible to achieve an economical, exactly positionable brake force generator that operates reliably and with low friction.

A central component of the brake force generator according to the invention is the control valve. According to the invention, this may be designed in such a way that it comprises a control valve housing displaceable relative to the base housing as well as a control valve element displaceable relative to the control valve housing, wherein on the control valve housing a housing sealing seat movable into sealing abutment with the control valve element is provided, wherein moreover a control valve sleeve, on which a sleeve sealing seat bringable into sealing abutment with the control valve element is provided, is coupled to the electromagnetic actuator, in particular to the armature thereof. During operation, with such an arrangement it may be provided that, given sealing abutment of control valve element and sleeve sealing seat and simultaneously mutually separate control valve element and housing sealing seat, the working chamber is fluidically connected to the vacuum chamber and that, given sealing abutment of control valve element and housing sealing seat and simultaneously mutually separate control valve element and sleeve sealing seat, for building up a pressure difference between working chamber and vacuum chamber the working chamber is separate from the vacuum chamber and fluidically connected to the ambient atmosphere. With such a design of the control valve, one proceeds initially from the conventional design of a control valve used in the context of pneumatic brake boosters and adapts the mode of operation thereof to the solution according to the invention. In particular, the control valve sleeve and hence the sleeve sealing seat are lifted off the control valve element not, say, by the force input element but by the electromagnetic actuator and so the precondition for the build-up of a pressure difference between vacuum chamber and working chamber is created. Consequently, in the working chamber a pressure above that in the vacuum chamber develops, which leads to a displacement of the movable wall in the chamber arrangement and hence to a displacement of the control valve housing. Finally, the sleeve sealing seat also moves back into abutment with the control valve element, so that a state of equilibrium arises, in which the actual actuating force is maintained. A further displacement of the electromagnetic actuator, in particular of the armature, leads to a corresponding adaptation of the pressure difference and hence, after a displacement of the control valve housing, to a corresponding adaptation of the actuating force acting upon the primary piston. When the driver reduces the pedal actuation to the point when he finally fully releases the brake pedal, the electromagnetic actuator reacts accordingly in that the armature is moved back into the basic position, which finally leads to the housing sealing seat lifting off the control valve element. This allows a renewed pressure equalization between the working chamber and the vacuum chamber until finally there is approximately pressure equality. In said case, the control valve housing likewise moves back into its basic position, so that the actuating force is finally reduced to zero.

In order to ensure that during normal operation, i.e. in the fully functional state of all components of the system, no mechanical coupling occurs between the force input element or a component connected thereto and in order nevertheless, in the event of failure of one of the components, to be able to guarantee an emergency operating mode, in which the driver of the vehicle is still able to brake the vehicle adequately, in an embodiment of the invention the following arrangements are made. In particular, this embodiment provides that between the force input element and a component that actuates the control valve, in particular the armature, a safety clearance is provided that, in the absence of displacement of the armature by the coil despite actuation of the brake pedal, is overcome so that the component that actuates the control valve, in particular the armature, is workingly connectable to the force input element, wherein a further displacement of the force input element that is induced by a brake pedal actuation is transmitted directly to the component that actuates the control valve, in particular the armature, and hence to the control valve housing. The safety clearance is dimensioned in such a way that during normal operation, i.e. when the electromagnetic actuator in response to a detected pedal actuation reacts in an intended manner, is never overcome, nor therefore does the force input element or a component connected thereto come into mechanical contact with the armature or a component of the control valve housing.

In an operating situation, in which the electrical activation of the electromagnetic actuator is not working correctly, for example owing to failure of the pedal actuation detecting device, the electromagnetic actuator, in particular the armature, remains in its basic position despite an actuation of the brake pedal by the driver. Consequently, the force input element or the component connected thereto moves closer and closer to the armature without resulting in a braking effect. Upon further depression of the brake pedal, the safety clearance is finally used up. The force input element or the component connected thereto comes into mechanical and working contact with the electromagnetic actuator, in particular with the armature, and displaces it. The valve sleeve is therefore also displaced, so that the sleeve sealing seat lifts off the control valve element. This leads however—as already described above—to the build-up of a pressure difference between vacuum chamber and working chamber, resulting in the generation of an actuating force. When the electromagnetic actuator is not working correctly, the brake force generator according to the invention, after the safety clearance is overcome, accordingly operates like a conventional brake booster.

Even in an operating situation involving failure of the vacuum source, for example of a separately designed vacuum pump, with the brake force generator according to the invention it is still possible to generate a high enough brake force to brake the vehicle. In this situation, the chamber arrangement remains ineffective. The arrangement according to the invention is however designed in such a way that the force input element after overcoming a further safety clearance finally comes mechanically into contact with the primary cylinder, so that the pedal actuating force exerted on the force input element, once the safety clearances have been overcome, is transmissible directly to the primary piston in order thereby to initiate a braking operation. The actuating force exerted on the force input element by the driver may then be transmitted directly to the primary cylinder.

As already explained above, an underlying idea of the invention is during normal operation, in the fully functional state of all components of the brake system, during each braking operation to achieve a generation of an actuating force acting upon the primary piston that is uncoupled from a pedal actuating force. In order, with a compact design of the brake force generator according to the invention, also to be able to generate relatively high actuating forces, a development of the invention provides that the chamber arrangement is designed as a tandem chamber arrangement comprising a first chamber arrangement and a second chamber arrangement separate from the first, wherein the first chamber arrangement comprises a first vacuum chamber and a first working chamber separated by a first movable wall from the first vacuum chamber. The second chamber arrangement in said case comprises a second vacuum chamber and a second working chamber separated by a second movable wall from the second vacuum chamber. Furthermore, the first and second chamber arrangement may be pressurized by means of the control valve. In this connection, according to the invention it may also be provided that the first movable wall and the second movable wall for the purpose of joint movement are connected, preferably rigidly, to one another.

In the previous description of the invention it has been mentioned several times that the force input element is generally not directly mechanically connected to the actuating force generating device. In order nevertheless to convey to the driver the familiar impression that the brake system is offering a mechanical resistance to an actuation of the brake pedal, the invention provides an as such known pedal counterforce simulating device. Such a pedal counterforce simulating device may be disposed for example in the direct vicinity of the force input element. This however generally leads to a considerable increase in the overall volume of the arrangement that is inconsistent with the requirement for compactness. To avoid such increases in volume, the invention provides that the pedal counterforce simulating device is integrated in a space-saving manner in the brake force generator according to the invention.

According to the invention, a measure for realizing such an integrated solution is for example such that the force input element is connected by a transmission piston arrangement to the pedal counterforce simulating device. In this connection, it may moreover be provided that the pedal counterforce simulating device is workingly connectable by a pedal counterforce hydraulic system to a damper arrangement. As it is then possible to transmit the action of the pedal counterforce simulating device, its components may be positioned at virtually any desired point of the brake force generator, i.e. wherever installation space is available.

In order upon actuation of the brake pedal to be able to convey to the driver a resistance response that is familiar from conventional brake systems, a development of the invention provides that the damper arrangement comprises a simulation spring, which is compressible by means of a force piston displaceable by means of the pedal counterforce hydraulic system, or/and fluid damping means, preferably a throttle, or/and a rubber-elastic stop washer. Whereas with the simulation spring and the rubber-elastic stop washer a progressive variation of force is achievable with increasing pedal actuation, the fluid damping means are used in particular to bring about a hysteresis that leads to a delayed return movement of the brake pedal after release thereof. The fluid damping means moreover have the effect that, given a sufficiently fast actuation of the brake pedal, they convey to the driver a resistance sensation familiar from conventional brake systems, namely in every operating situation of the brake system according to the invention.

As already explained above, the brake force generator is generally so designed that, even after the failure of individual components, it guarantees a reliable braking effect. Particularly when it is necessary to make the best possible use of the pedal actuating force exerted on the brake pedal by the driver in order to generate an actuating force in an emergency operating situation, the dissipation of some of the pedal actuating force owing to the action of the pedal counterforce simulating device is to be avoided. A development of the invention therefore provides that the pedal counterforce simulating device is cut in and cut out, as and when required. In particular, in this connection an embodiment of the invention provides that the hydraulic system of the pedal counterforce simulating device is designed with a controllable block valve, which in a first position, preferably in its passive position, uncouples the damper arrangement and the transmission piston arrangement hydraulically from one another and allows a substantially undamped movement of the transmission piston arrangement and which in a second position, preferably in its active position, connects the damper arrangement and the transmission piston arrangement hydraulically to one another. With regard to the control of the block valve, according to the invention it may be provided that the block valve at the start of a brake pedal actuation is switched from its passive position to its active position and is not returned from its active position to its passive position until after completion of the brake pedal actuation. Furthermore, the block valve may already be used to achieve a throttling effect in that it is provided with a throttle element, preferably with a spring-biased restrictor, which in the active position of the block valve throttles a hydraulic fluid flow to the damper arrangement. In this way, the hysteresis effect and the damping effect of the damper arrangement may be further intensified. Preferably, the restrictor is so disposed that, even when the block valve is switched to its passive position, it throttles a fluid flow in the hydraulic system so that the driver for example in an emergency operating situation, in which the damper arrangement is not connected to the brake pedal, senses a resistance upon an actuation of the brake pedal.

With regard to the design of the master cylinder, a development of the invention provides that it is formed in a cylinder housing, preferably in the form of a cylinder bore open at one end. The block valve, like the damper arrangement, is preferably integrated in the cylinder housing or provided as a separate module thereon. The brake force generator according to the invention may also be made even more compact by virtue of the damper arrangement being integrated in the cylinder housing or provided as a separate module thereon. Thus, the unit of the pedal counterforce simulating device that actually takes up installation space, namely the damper arrangement, may be disposed at a point where installation space is available and need not be positioned in the direct vicinity of the pedal.

For the sake of ease of assembly and a compact structure, a development of the invention provides that the cylinder housing together with the components disposed therein is insertable as a module into the base housing and releasably connected thereto.

In order to increase the reliability of the brake system, according to the invention it may further be provided that in the master cylinder a secondary piston is displaceably guided, that the secondary piston with the master cylinder encloses a secondary pressure chamber for generating a hydraulic brake pressure, and that the primary piston with the master cylinder and the secondary piston encloses the primary pressure chamber for generating a hydraulic brake pressure. In this connection, it may moreover be provided that the primary piston and optionally the secondary piston are biased in each case into a basic position by means of biasing springs associated therewith.

The above description has already gone into detail about the individual components of the pedal counterforce simulating device. With regard to its arrangement, a development of the invention provides that the primary piston is provided with a through-bore, in which an actuating piston is guided, wherein the actuating piston has an actuating cylinder bore, in which a separating piston is guided displaceably by means of the transmission piston arrangement, wherein the separating piston in the actuating piston delimits a hydraulic fluid chamber that is fluidically connected to the hydraulic system of the pedal counterforce simulating device. In order to be able to ensure permanent contact between the transmission piston arrangement and the separating piston and hence guarantee a reliable coupling of the force input element to the pedal counterforce simulating device, a development of the invention provides that a component of the transmission piston arrangement that contacts the separating piston is releasably coupled to the separating piston magnetically or/and adhesively or/and by latching. Furthermore, according to the invention it may be provided that the actuating piston is fixed in the cylinder housing. Alternatively, according to the invention it may be provided that the actuating piston is displaceable relative to the cylinder housing. Preferably, in this connection it is provided that the actuating piston is displaceable counter to the action of a spring element relative to the cylinder housing. In said case, the spring element may be under bias, so that a displacement occurs only when a specific minimum force is exceeded. For the coupling of actuating piston and spring element, in a simply designed yet reliable constructional variant of the invention a stop pin provided on the actuating piston may be used.

The invention may further provide an electronic control device, which monitors the pedal actuation detecting device and activates the electromagnetic actuator in accordance with an output signal of the pedal actuation detecting device, preferably with due regard to a defined characteristic curve or a defined family of characteristics. In dependence upon prevailing operating parameters, individual characteristic curves may be selected from the family of characteristics and form the basis of the activation of the brake force generator. Depending on the design of the brake system, according to the invention it may further be provided that the characteristic curve or the family of characteristics is permanently defined or adaptable to detected operating parameters. It is therefore also possible, at the request of the driver or by way of adaptation to the determined driver behaviour, to select or create various characteristic curves that determine the behaviour of the brake.

In this connection, a development of the invention provides that the electronic control device activates the electromagnetic actuator in accordance with a hydraulic pressure detected in the hydraulic system of the pedal counterforce simulating device, for example at the block valve. With regard to the activation of the brake force generator according to the invention, it may further be provided that the electronic control device activates the electromagnetic actuator in accordance with a parameter determined by a vehicle control system, such as for example the distance from a vehicle travelling in front, the present hydraulic pressure in the brake system, the actual vehicle deceleration or the like. Furthermore, according to the invention it may be possible for the electronic control device to activate the electromagnetic actuator in accordance with a time rate of change of the output signal of the pedal actuation detecting device or/and of the hydraulic pressure detected in the hydraulic system of the pedal counterforce simulating device, for example at the block valve. As explained above, in specific operating situations it is necessary to deactivate the pedal counterforce simulating device. For this purpose, it may be provided that the electronic control device activates the block valve in accordance with an output signal of the pedal actuation detecting device.

It may further be provided that the electronic control device upon activation of the electromagnetic actuator takes into account an output signal of the position sensor. The effect achievable thereby is that the present position of the movable wall or, in the case of a tandem arrangement, of both movable walls is used as feedback information in order, for correction purposes, to reactivate the actuator within a closed control loop.

Other advantages of this invention will become apparent to those skilled in the art from the following detailed description of the preferred embodiment, when read in light of the accompanying drawings.

DETAILED DESCRIPTION OF THE INVENTION

Figure 2:
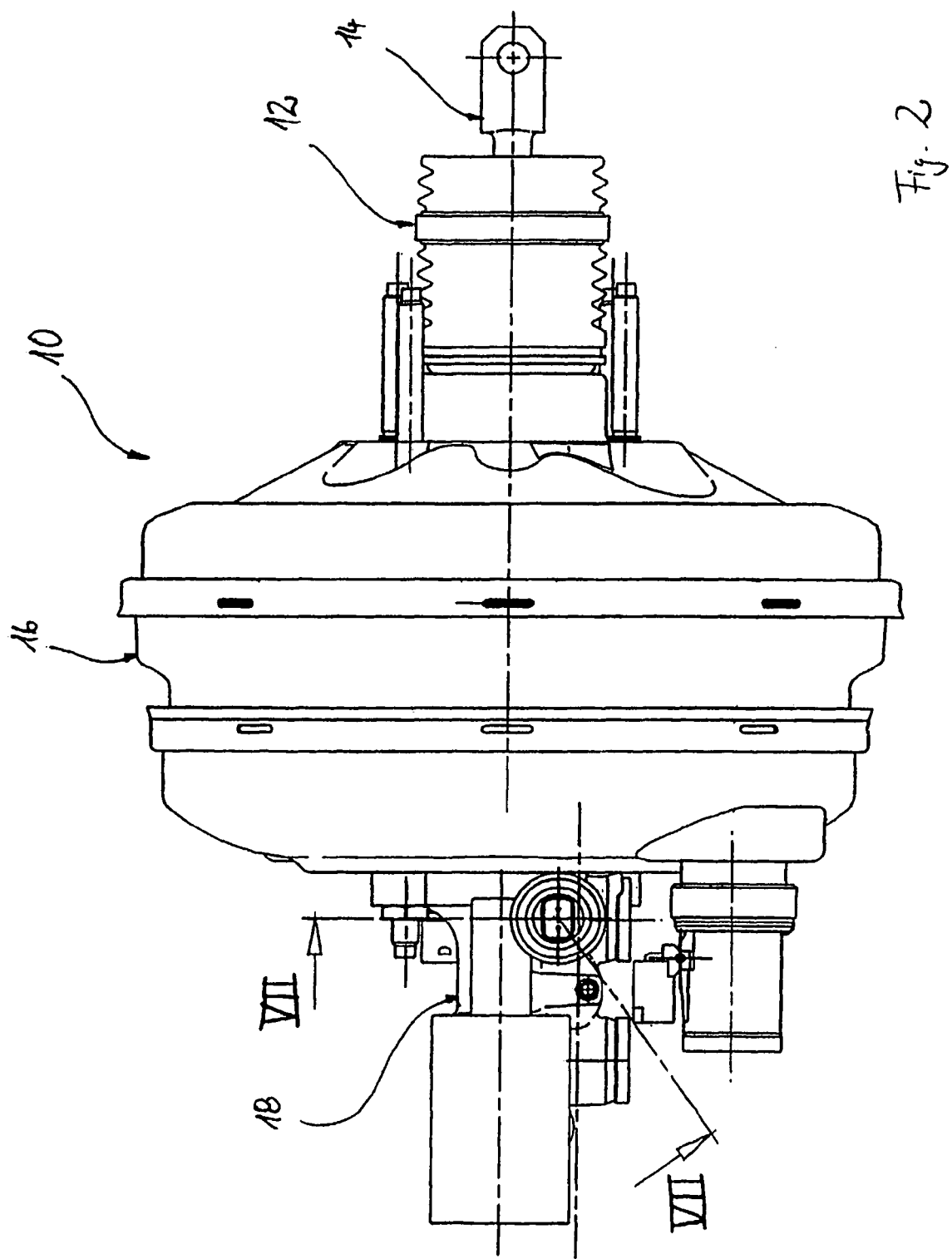
FIG. 2 an enlarged side view of the brake force generator.

In FIG. 2 a brake force generator according to the invention is represented in side view and generally denoted by 10. It comprises an actuating unit 12, into which a force input element 14 is introduced. The force input element 14 at its free end is connectable to a brake pedal, which is not shown in FIG. 2. The actuating unit 12 is connected to a chamber arrangement 16. At the side of the chamber arrangement 16 remote from the actuating unit 12 it is possible to see part of a cylinder housing 18 of the master cylinder.

For a detailed description of the structure of the brake force generator 10 according to the invention, reference is to be made in the following to FIG. 3. The basic structure of the brake force generator 10 according to the invention consists of two modules, namely on the one hand the cylinder housing 18 and on the other hand the brake force generator housing 20, into which the cylinder housing 18 is inserted and to which the cylinder housing 18 is releasably connected. Running into the, in FIG. 3, righthand part of the brake force generator 10, in particular of the housing 20, is the force input element 14, which is of a rod-shaped design. In this region a control valve 22 is provided. The control valve 22 comprises a control valve housing 24, which is displaceable relative to the housing 20. Provided inside the control valve housing 24 is a valve sleeve 26, which is displaceable relative thereto.

The control valve housing 24 is connected in a fixed manner to a first movable wall 28 disposed in the chamber arrangement 16. The first movable wall 28 subdivides the, in FIG. 3, righthand part of the chamber arrangement 16 into a vacuum chamber 30 and a working chamber 32. The vacuum chamber 30 is separated from the, in FIG. 3, lefthand part of the chamber arrangement 16 by a rigid wall 34 fixed in the housing 20. This part of the chamber arrangement 16 likewise comprises a vacuum chamber 36 and a working chamber 38, which are separated from one another by a second movable wall 40. The first movable wall 28 and the second movable wall 40 are rigidly connected to one another for the purpose of joint movement. For this purpose, the second movable wall 40 is fastened on a coupling sleeve 42, which is connected by a connecting bush 44 in a fixed manner to the control valve housing 24.

In the control valve housing 24 an electrically controllable coil 46 of an electromagnetic actuator 48 is disposed. The actuator 48 further comprises a magnetic armature 50, which is displaceable relative to the control valve housing 24 and to the coil in the direction of the longitudinal axis A of the brake force generator 10. The armature 50 is coupled for a joint movement in axial direction to the valve sleeve 26. The armature 50 is moreover provided with an axial through-bore, through which a transmission piston 52 extends displaceably. The armature 50 is biased into the position shown in FIG. 3 by means of a spring 54. At its, in FIG. 3, righthand end the transmission piston 52 is workingly connected by a coupling element 56 to the force input element 14. In the inoperative state of the brake force generator 10 shown in FIG. 3, a safety clearance s is provided between the armature 50 and the coupling element 56.

The valve sleeve 26, the control valve housing 24 and a valve element 58 displaceable relative to these two parts form the actual control valve 22. In the state shown in FIG. 3, the valve sleeve 26 is supported by its sleeve sealing seat 60 facing the valve element 58 against the valve element 58. In this state, moreover, a housing sealing seat 62 formed on the control valve housing 24 is lifted off the valve element 58. In the state shown in FIG. 3, the control valve 22 connects in each case the vacuum chamber 30 to the working chamber 32 and the vacuum chamber 36 to the working chamber 38. The vacuum chambers 30 and 36 are in said case connected to a non-illustrated vacuum source, for example to the intake tract of an internal combustion engine of a vehicle equipped with the brake force generator 10 or to a separately designed vacuum pump. The force input element is biased into the position shown in FIG. 3 by means of a resetting spring 63.

Figure 3:
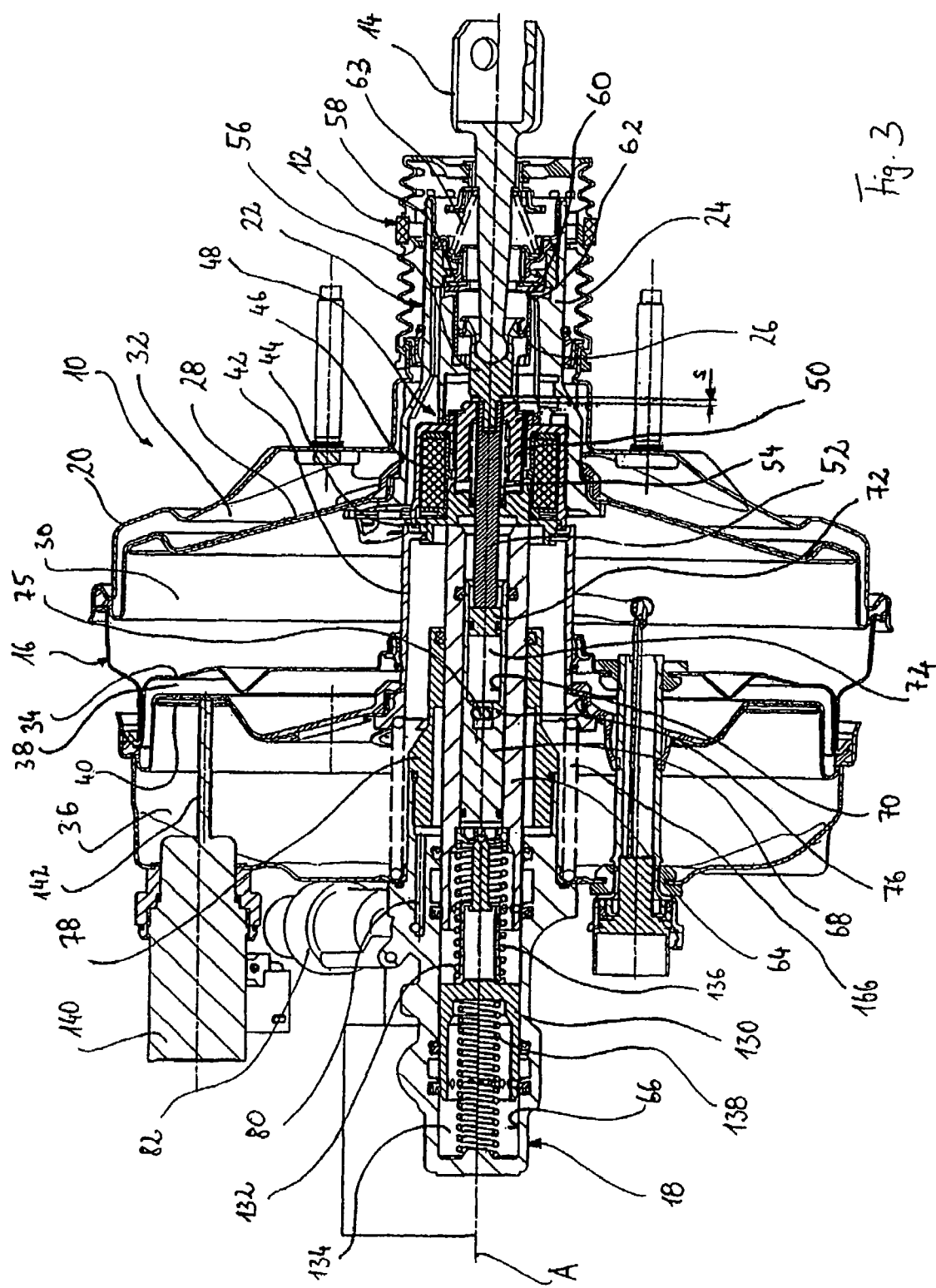
FIG. 3 a longitudinal sectional view of the brake force generator according to the invention in non-actuated position.

The transmission piston 52 with its, in FIG. 3, left end extends into a primary piston 64 that is constructed with an axial through-bore. The primary piston 64 is guided sealingly in a bore 66, which is formed in the cylinder housing 18 and is open at one end. In the through-bore of the primary piston 64 an actuating piston 68 is displaceably guided. The actuating piston 68 likewise has a bore 70, which is open at one end and closed by means of a separating piston 72 displaceable therein. The separating piston 72 with the actuating piston 68 encloses a hydraulic chamber 74. The actuating piston 68 is supported via a stop pin 75, which extends through an oblong hole shaft 73 provided in the primary piston 64, against a diameter step in the interior of a closure sleeve 78, which is connected in a fixed manner to the cylinder housing 18. The actuating piston 68 is therefore prevented from moving axially in FIG. 3 to the right.

The hydraulic chamber 74 is connected by a connection channel 76 to the interior of the closure sleeve 78 and communicates via this interior with a fluid channel 80 formed in the cylinder housing 18. The fluid channel 80 leads to the electromagnetic block valve 82 shown in greater detail in a sectional representation in FIG. 7. This block valve 82 comprises an electromagnetically controllable coil 84 and an armature 86 guided movably in the coil 84. The armature 86 is biased into the position shown in FIG. 7 by means of a resetting spring 88. The armature 86 has an extension 90, with the free end of which it may press a spherical valve element 92 against a valve seat 94. The valve seat 94 connects a fluid chamber 96 to an ante-chamber 98 by a through-bore that is sealable by means of the valve element 92. The fluid chamber 96 is fluidically connected by a connection channel 100 to a hydraulic fluid reservoir 102.

The ante-chamber 98 is fluidically connected by a connection channel 104 to a pedal counterforce simulating device 106.

In the ante-chamber 98, a restrictor 99 is biased in the direction of the valve element 92 by means of a biasing spring 101. The restrictor 99 has a throttle bore 103. Disposed in the ante-chamber 98, moreover, is a retaining element 105 that facilitates assembly.

Figure 5:
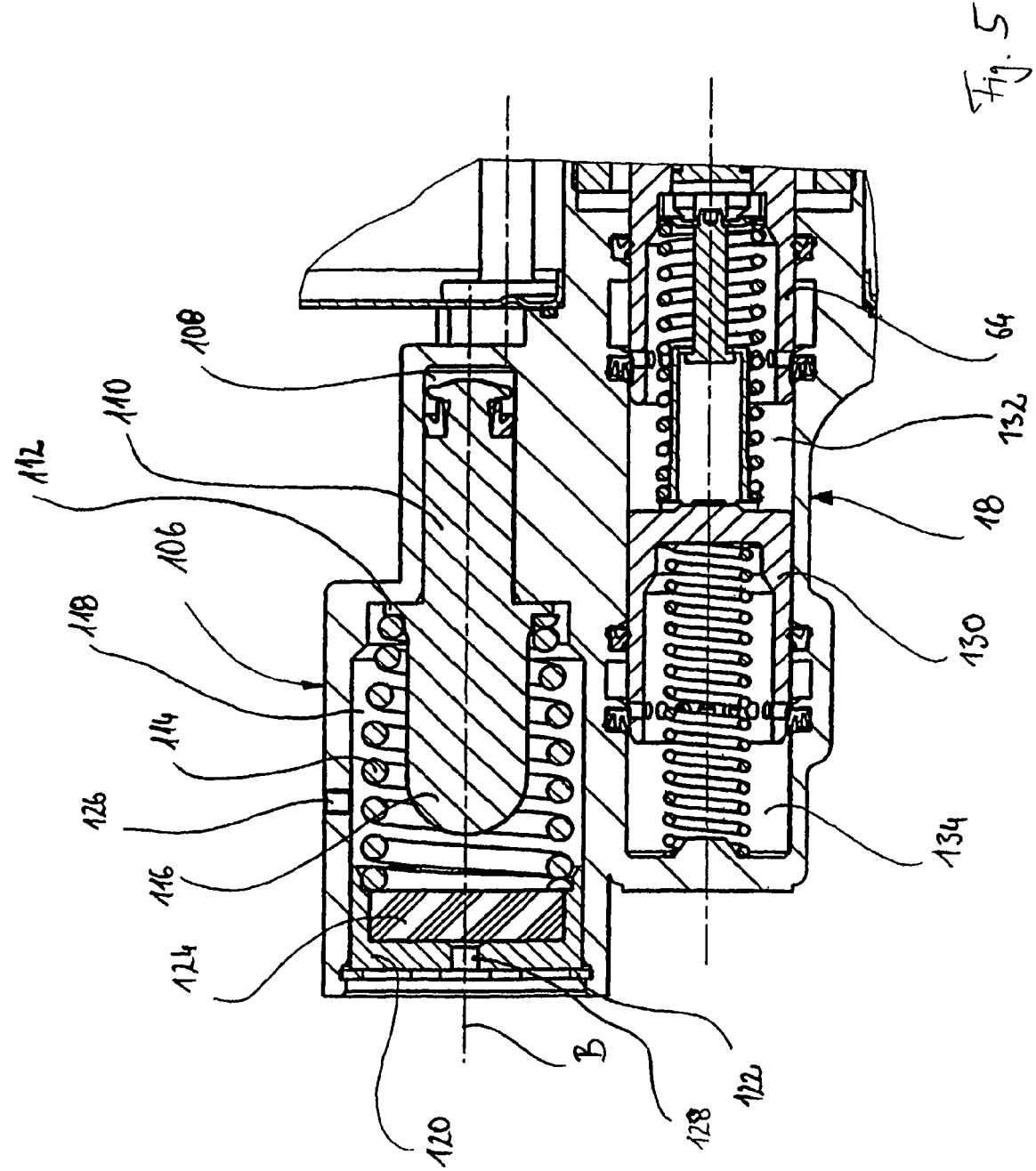
FIG. 5 a detail view of a first embodiment of a damper arrangement of a pedal counterforce simulating device.

The pedal counterforce simulating device 106 is shown in FIG. 5 to an enlarged scale and in a sectional representation in a first embodiment, in which it is integrated in the cylinder housing 18. The connection channel 104 opens out into a hydraulic chamber 108, which is delimited by means of a simulation piston 110. The simulation piston 110 is displaceable along a longitudinal axis B inside the cylinder housing 18. The simulation piston 110 has a seating flange 112, against which one end of a simulation spring 114 rests. The simulation piston 110 further comprises a rounded-off extension 116, which projects into the simulation spring 114. The simulation spring 114 is disposed in a spring chamber 118, which is closed by a closure plug 120 secured by means of a fastening ring 122. The closure plug 120 has a central opening 128. The spring chamber 118 is moreover connected by a lateral bore 126 to the atmosphere. Disposed in the closure plug 120 is a rubber-elastic stop washer 124, into which the extension 116 of the simulation piston 110 may engage elastically given sufficient further displacement along the axis B.

Returning to the structure of the brake force generator according to the invention as represented in FIG. 3, it is clear from this representation that in the cylinder housing 18 in addition to the primary piston 64 a secondary piston 130 is moreover displaceably received. The primary piston 64 together with the boundary wall of the bore 66 and the secondary piston 130 as well as the, in FIG. 3, left end of the actuating piston 68 delimits a primary pressure chamber 132. The secondary piston 130 together with the boundary wall of the bore 66 delimits a secondary pressure chamber 134. Primary piston and secondary piston are biased into the position shown in FIG. 3 by means of resetting springs 136 and 138.

Finally, in FIG. 3 a position sensor 140 is additionally shown. The position sensor 140 comprises a tappet 142, which is spring-biased in FIG. 3 to the right and rests with its free end permanently against the movable wall 40 and detects the actual position thereof.

With regard to the assembly of the brake force generator 10 shown in FIG. 3, it should be noted that the brake force generator as such consists of two basic modules. The first basic module comprises the housing 20 and all of the components disposed therein, in particular the components of the chamber arrangement 16 and of the control valve 22. The second basic module comprises the cylinder housing 18 and all of the components provided thereon, in particular the pedal counterforce simulating device 108, the block valve 82, as well as the primary piston 64 and the secondary piston 130. These two basic modules are preassembled and connectable in the preassembled state to one another, wherein the cylinder housing 18 may be introduced sealingly into the housing 20. The interface of these two components then forms the mutually contacting seating surfaces of primary piston 68 and connecting bush 44 as well as transmission piston 52 and separating piston 72. In particular, the interface between transmission piston 52 and separating piston 72 is to be designed free of play in order to convey to the driver an immediate response of the brake system to a pedal actuation. The separating piston 72 is therefore of a magnetic design so that during assembly it positively contacts the ferromagnetic transmission piston 52 and remains in contact therewith. Optionally, the bore 70 may also be provided at its open end with a retrofitted stop, for example a securing ring or beading, thereby preventing an unintentional sliding-out of the separating piston 72.

Figure 1:
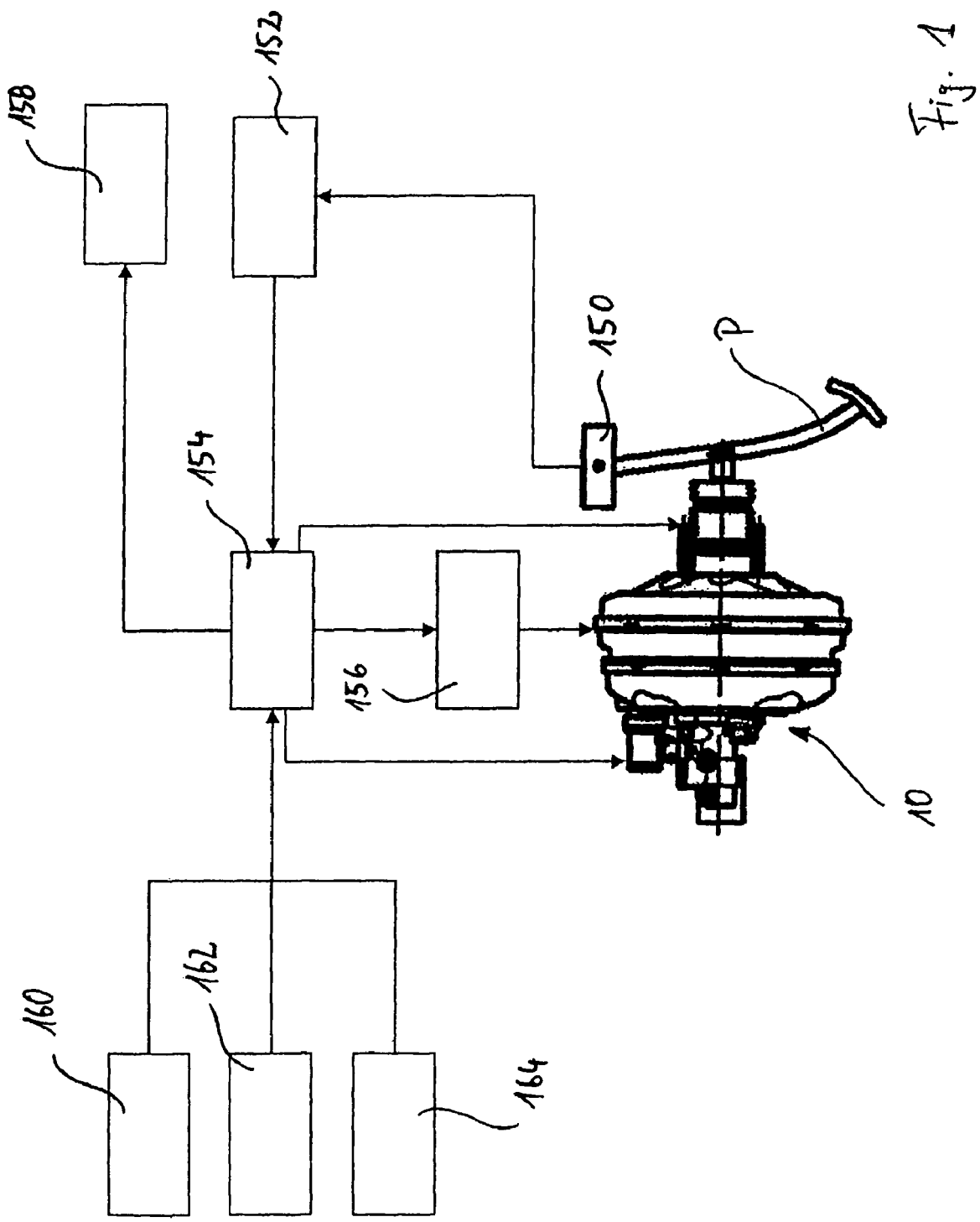
FIG. 1 a diagrammatic overview representation of the brake force generator according to the invention and of the vehicle components connected thereto.

Before going into detail about the actual mode of operation of the brake force generator 10 according to the invention, its incorporation in a vehicle brake system is to be described in detail with reference to FIG. 1. There, the brake force generator 10 according to the invention is diagrammatically shown with a brake pedal P. A pedal actuation is detected by means of an angle-of-rotation sensor 150 and communicated to an angle-of-rotation sensor evaluation device 152. This transmits a signal corresponding to the actual pedal actuation to an electronic control unit 154. In accordance with the signal characterizing the actual pedal actuation, the electronic control unit 154 activates a vacuum pump 156 as well as further components of the brake force generator 10, as will be additionally described below. The electronic control unit 154 moreover activates a brake light 158 in response to a detected pedal actuation. The electronic control unit 154 further receives signals from various control systems inside the vehicle, such as for example an electronic stability program 160, an antilock braking system 162, an automatic collision avoidance system (cruise control) 164 or the like. The signals flowing from these programs to the electronic control unit 154 are evaluated and used to control the brake force generator according to the invention.

Figure 4:
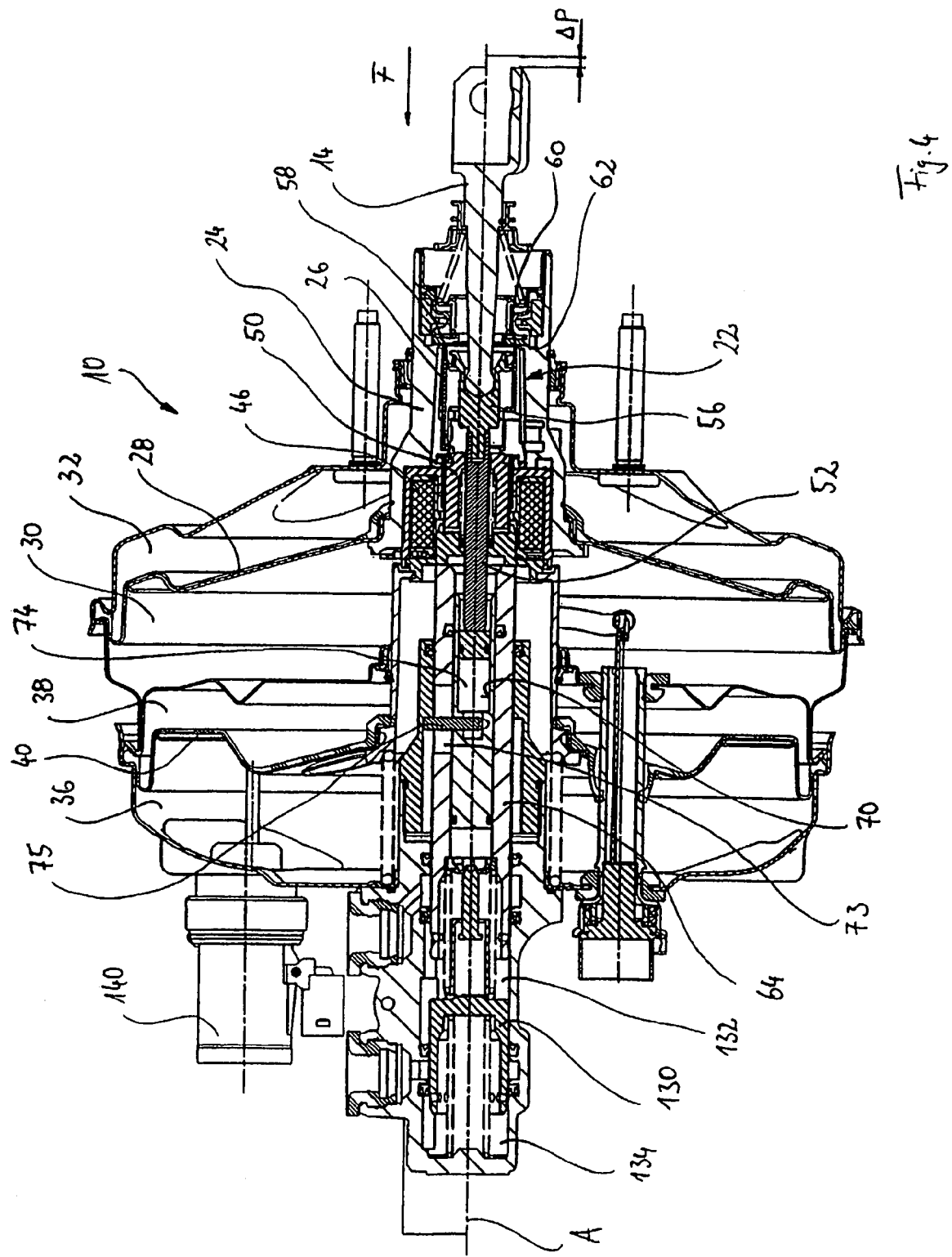
FIG. 4 a view as in FIG. 3, but in partially actuated position.

There now follows a discussion of the mode of operation of the brake force generator according to the invention with reference to FIGS. 3 and 4.

FIG. 4 shows the brake force generator 10 according to the invention in a partially actuated position in a normal mode of operation. Following an actuation of the brake pedal, the force input element 14 is loaded with the force F and relative to the basic position shown in FIG. 3 is displaced by the distance Δp along the longitudinal axis A of the brake force generator. The brake pedal actuation is detected directly by the angle-of-rotation sensor 150 shown in FIG. 1 and communicated to the electronic control unit 154. It activates the coil 46 and energizes it in accordance with defined characteristic curves and optionally with due regard to further parameters, for example of the stability program 160, the antilock braking system 162 or the distance monitoring device 164. The energizing of the coil 46 leads to the build-up therein of a magnetic field, which draws the armature 50 in FIG. 4 leftwards into the coil. In said case, the valve sleeve 26 is carried along by the armature 50. The valve element 58 moves jointly with the valve sleeve 26 until the valve element 58 comes into abutment with the housing sealing seat 62. The sleeve sealing seat 60 therefore lifts off the valve element 58. As a result, the first vacuum chamber 30 is isolated from the first working chamber 32, the second vacuum chamber 36 is isolated from the second working chamber 38, and the working chambers 32 and 38 are connected to the ambient atmosphere. A pressure above atmospheric builds up in the working chambers 32 and 38 and leads to a displacement of the control valve housing 24 counter to a force of a resetting spring 166 and hence to a displacement of the primary piston 64 and the secondary piston 130. This leads in the primary pressure chamber 132 and in the secondary chamber 134 to the build-up in each case of a brake pressure that is used in a vehicle brake system connected to the brake force generator 10 to brake the vehicle. The two movable walls 28 and 40 move jointly with control valve housing 24 until both sealing seats, namely the sleeve sealing seat 60 and the housing sealing seat 62, are back in abutment with the valve element 58. In this state, the system is in equilibrium and, in the absence of external influence, no further change occurs.

As explained above, actuation of the control valve 22 is effected by a displacement of the armature 50, which is moved along the longitudinal axis A by the magnetic force generated in the coil 46. In the actuated state shown in FIG. 4, however, the movement of the force input element 14 and the force F initiating this movement is not transmitted to the armature 50. Rather, this movement of the force input element 14 is transmitted via the coupling element 56 to the transmission piston 52. The transmission piston 52 is consequently displaced inside the primary cylinder 64, in particular inside the bore 70 of the actuating piston 68 that is open at one end, and in said case displaces the separating piston 72 in FIG. 4 to the left, wherein the actuating piston 68 owing to the hydraulic pressure prevailing in the primary pressure chamber 132 remains in its position relative to the housing 18. As a result of the movement of the separating piston 72, hydraulic fluid is fed from the hydraulic chamber 74 through the connection channel 76 and the fluid channel 80 to the electromagnetic block valve 82. Owing to the detected pedal actuation, the electromagnetic block valve 82 is switched by the electronic control unit 154 into its active position, in which it presses the valve element 92 against the valve seat 94. The hydraulic fluid fed to the block valve 82 is therefore unable to flow into the hydraulic fluid reservoir 102 and is instead fed into the hydraulic chamber 108 counter to the resistance of the pedal counterforce simulating device 106. In said case, the simulation piston 110 is displaced, with simultaneous compression of the simulation spring 114, into the spring chamber 118. Depending on the speed of displacement of the simulation piston 110, a fluidic damping occurs owing to a throttling effect of the restrictor 99, when hydraulic fluid flows through the throttle opening thereof, and of the bore 126, when the air contained in the spring chamber 118 escapes. Finally, given sufficient further deflection of the extension 116, a highly damped movement of the simulation piston 110 occurs as soon as the extension 116 comes into contact with and compresses the rubber-elastic stop washer 124.

Upon release of the brake pedal by the driver, the system moves from the position shown in FIG. 4 back into the position shown in FIG. 3. The force input element 14 is in said case returned to its basic position owing to the action of the pedal counterforce simulating device 106 and further resetting springs. This resetting movement however occurs with a hysteresis since, on the one hand, the bore 126 allows only a throttled passage of air into the spring chamber 118 and, on the other hand, the restrictor 99 also throttles a return flow of hydraulic fluid into the hydraulic chamber 74.

During the activation of the actuator 48, the electronic control unit 154 by means of the position sensor 140 permanently detects the actual position of the second movable wall 40 and of the first movable wall 28 connected thereto. Thus, the actual position of the control valve housing 24 may be detected and compared with a setpoint position defined by the pedal actuation. Given a deviation of actual position and setpoint position, for example because of a variation of the pedal position by the driver or because of other external influences, the electronic control unit 154 activates the actuator 48 in a corrective manner. In an emergency braking situation, in which the brake pedal is depressed rapidly and with a high actuating force by the driver, the electronic control unit 154 may also energize the actuator 48 to a superproportional extent in order to quickly build up a high pressure difference in the chamber arrangement 16 and hence use the brake force generator 10 to generate a sufficiently high brake force for the emergency braking operation.

The above description demonstrates that during normal operation the actuating force F exerted on the force input element leads merely to a displacement of the components: coupling element 56, transmission piston 52 and, as a result of hydraulic transmission, a movement of the simulation piston 110 but has no direct effect whatsoever on the components of the control valve 22. Rather, the actuating force that displaces the primary piston 64 is initiated by activation of the actuator 48 and displacement of the armature 50, thereby actuating the control valve 22 in order to achieve a pressure difference in the chamber arrangement 16. This pressure difference leads to a displacement of the control valve housing 24 and hence of the primary piston 64 and the secondary piston 130.

There now follows a description of emergency operating situations which demonstrate that the brake force generator 10 according to the invention continues to function despite a defect in one or more components.

A first emergency operating situation to be considered occurs when the coil 46 is no longer properly activated. The reason for this may be for example that the angle-of-rotation sensor 150 is faulty or that there is a fault in the electrical system of the vehicle. Given such a faulty operating state, the control valve 22 may no longer be actuated by the actuator 48. Nevertheless, with the brake force generator 10 according to the invention a sufficiently good braking effect may be achieved. Upon a brake pedal actuation, the force input element 14 is displaced in FIG. 3 to the left. Such a displacement remains ineffective until the safety clearance s has been overcome. Once this has occurred, the coupling element 56 comes into mechanical contact with the armature 50 and displaces it further in FIG. 3 to the left. This leads—as described above for normal operation upon a displacement of the armature 50—to displacement of the valve sleeve 26 until the housing sealing seat 62 comes into abutment with the valve element 58 and the sleeve sealing seat 60 is lifted off the valve element 58. This leads to a pressure difference in the chamber arrangement 16 that causes a displacement of the control valve housing 24 and finally a displacement of the primary piston 64. In this first emergency operating situation, therefore, the safety clearance s merely has to be overcome until a braking effect resulting from the pedal actuating force exerted on the brake pedal is achieved, which is then ultimately generated as in a conventional pneumatic brake booster.

Figure 7:
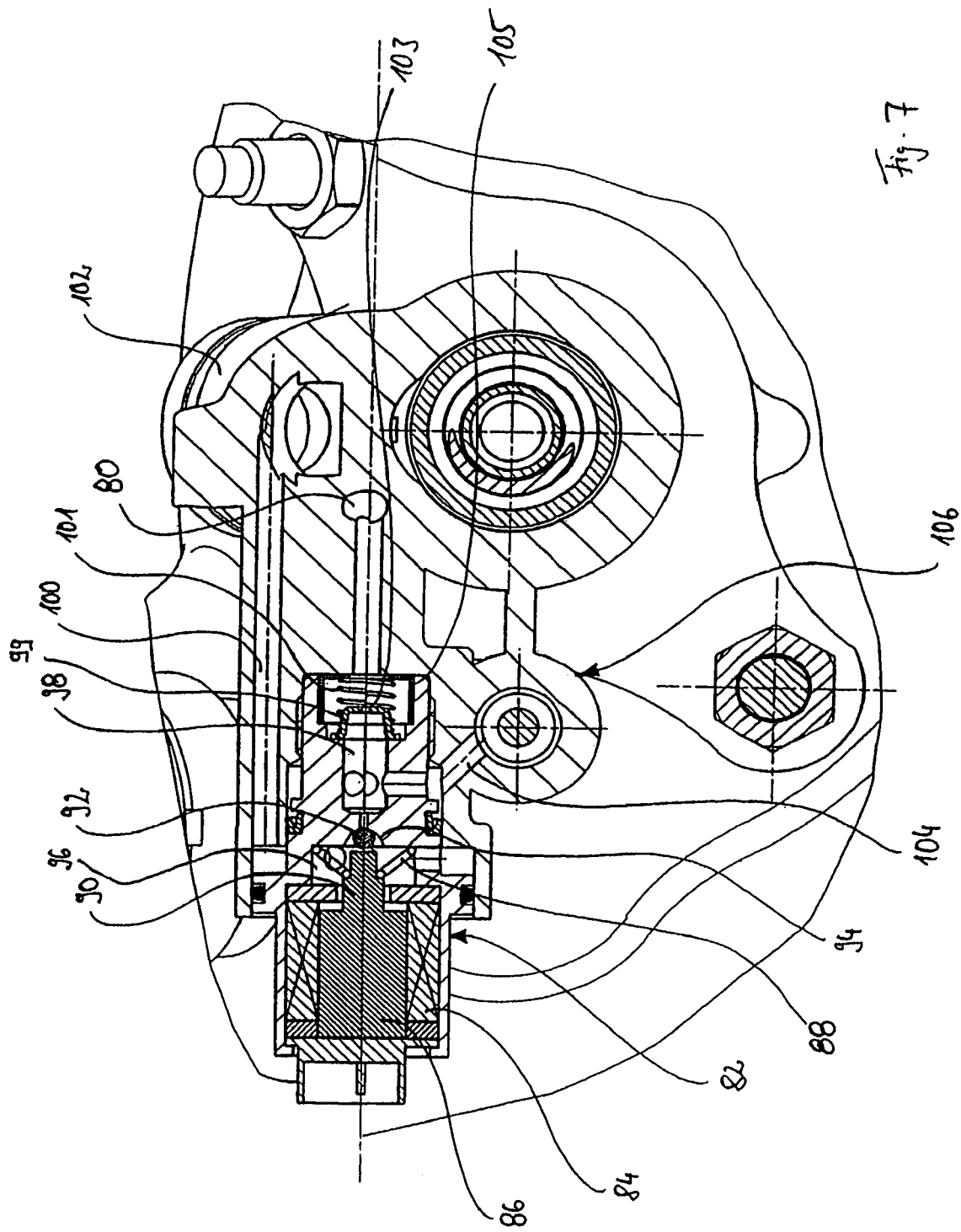
FIG. 7 a sectional view cut along the cutting line VII-VII of FIG. 2.

It should be pointed out that in the previously described emergency operating situation, in which there is no proper activation of the actuator 48, there is also no transfer of the block valve 82 from the passive position shown in FIG. 7 to an active position by means of the electronic control unit 154. Rather, the block valve 82 remains in the passive position shown in FIG. 7, so that no substantial counterforce is offered by the pedal counterforce simulating device 106 to the displacement of the force input element 14 occasioned by the pedal actuation. The hydraulic fluid expressed from the hydraulic chamber 74 by the displacement of the force input element 14 is pressed substantially without resistance. However, despite the block valve 82 being closed, the restrictor 99 opposes a flow of hydraulic fluid into the reservoir 102, so that the driver also in the emergency operating situation and in particular in the event of a rapid brake pedal actuation senses a resistance at the brake pedal.

In addition to the previously described emergency operating situation, in which there is merely a failure of the electrical activation of the actuator 48 and in which despite this fault an adequate brake force generation is guaranteed by the brake force generator 10 according to the invention, a further emergency operating situation is to be considered, in which in addition to or instead of a defect in the activation of the actuator 48 a fault affecting the mode of operation of the chamber arrangement 16 also arises. Such a fault might arise, for example, if the vacuum pump 156 of FIG. 1 was no longer working properly. As a result, it would no longer be possible to generate a vacuum in the vacuum chambers 30 and 36, so that at the movable walls 28 and 40 it would also no longer be possible to build up a pressure difference that might be used for brake force generation and ultimately for the displacement of primary piston 64 and the secondary piston 130.

The brake force generator 10 according to the invention is designed in such a way that, even in such an emergency operating situation, it allows adequate brake force generation. Referring to FIG. 3, the brake force generator 10 in such a situation behaves as follows: upon an actuation of the brake pedal, once again the force input element 14 is displaced in the direction of the longitudinal axis A. Despite this displacement of the force input element 14, however, it is impossible to generate a brake force by means of the chamber arrangement 16 owing to the absence of a pressure difference in the chamber arrangement between the vacuum chambers 30 and 36 and the working chambers 32 and 38. The position sensor 140 therefore detects that the movable wall 40 despite the pedal actuation is not moving and immediately reports this to the electronic control unit 154. Because of this signal, the electronic control unit 154 detects an emergency operating situation and leaves the block valve 82 in its passive position, so that the pedal counterforce simulating device 106 remains ineffective. Once again, however, the throttling effect of the restrictor 99 remains unaffected. An activation of the actuator 48 is also unnecessary and does not occur.

Because of the movement of the force input element 14 in axial direction, therefore, the safety clearance s is first used up, so that the coupling element 56 comes into contact with the armature 50. Upon a further movement of the force input element 14 in axial direction, the armature 50 together with the coupling element 56 is displaced further by the force input element 14 until the armature 50 finally comes into abutment with the, in FIG. 3, righthand region of the connecting bush 44. The force input element 14 is then connected by the coupling element 56, the armature 50 and the connecting bush 44 workingly to the primary cylinder 64. The primary cylinder 64 upon a further movement of the force input element 14 is therefore displaceable inside the cylinder housing 18 so that in the primary pressure chamber 132 and in the secondary pressure chamber 134 a brake pressure builds up, by means of which the vehicle may be adequately braked. The brake force generator 10 according to the invention, in this second emergency operating situation too, therefore offers a possibility of generating a sufficiently high brake force in that it allows the actuating force generated at the brake pedal to be transmitted directly to the primary piston 64. In this emergency operating situation, the driver may press on the brake pedal in such a way that his pedal actuating force is transmitted directly to the primary cylinder 64. The term also used in this context is "push-through function".

Figure 6:
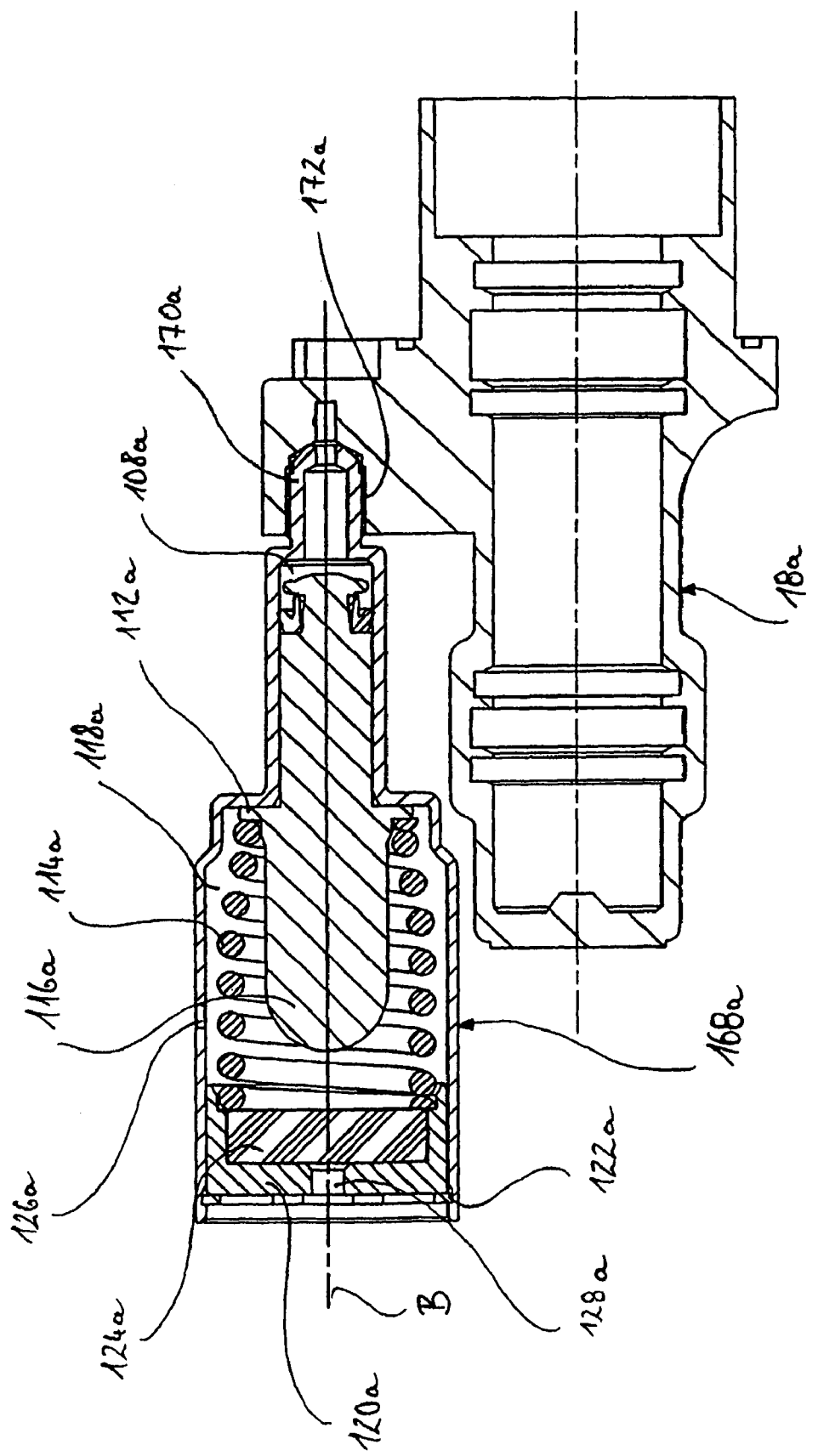
FIG. 6 a view as in FIG. 5 of a second embodiment of the damper arrangement of the pedal counterforce simulating device.

The following is a brief description of FIG. 6. FIG. 6 shows a second embodiment of the pedal counterforce simulating device. To facilitate the description and avoid repetition, for components of an identical type or function the same reference characters as in the description of FIG. 5 are used, but with the letter "a" appended.

The embodiment according to FIG. 6 differs from the embodiment according to FIG. 5 only in that the hydraulic chamber 108a, the simulation piston 110a, the simulation spring 114a, the rubber-elastic stop washer 124a and the closure plug 120a are disposed in a separate housing 168a and designed as a preassembled module, wherein the housing 168a is screwed by means of a threaded connection piece 170a tightly into a corresponding location opening 172a of the housing 18a.

Figure 8:
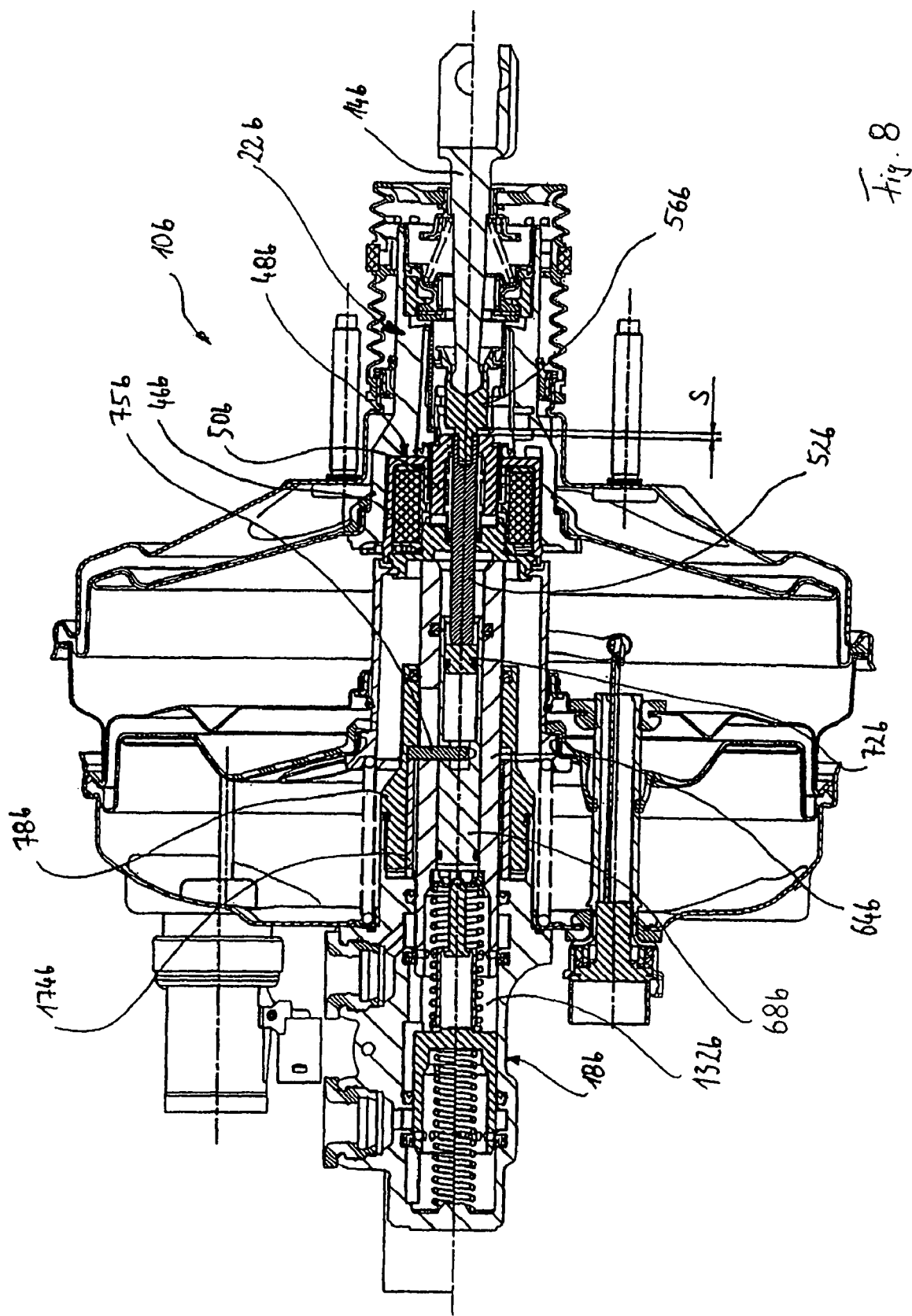
FIG. 8 a third embodiment of the brake force generator according to the invention and FIG. 9 a fourth embodiment of the brake force generator according to the invention.

FIG. 8 shows a further embodiment of the brake force generator according to the invention. To avoid repetition, once again only the differences from the embodiments according to FIGS. 3 and 4 are described, wherein for components of an identical type or function once again the same reference characters as before in the description of FIGS. 3 and 4 are used, but with the letter "b" appended.

The embodiment according to FIG. 8 differs from the embodiment according to FIG. 3 only in that the stop pin 75b is fixed in the closure sleeve 78b by means of a clamping sleeve 174b, wherein the clamping sleeve is anchored firmly in the larger-diameter portion of the stepped internal bore of the closure sleeve 78b. The stop pin 75b is therefore not displaceable relative to the housing 18b.

The embodiment according to FIG. 8 is suitable in particular for the application of the brake force generator 10b according to the invention, in which regenerative braking is to be effected. This means that the brake force generator 10b is used in a vehicle, which recovers the energy released during braking at least partially by means of a generator. Such operating conditions exist in particular in hybrid vehicles, in which depending on the operating situation the vehicle may be driven both by means of an electric motor and by means of an internal combustion engine. During the braking operation, some of the energy needed for electric motor operation is generated by the generator and stored temporarily in an accumulator. Regenerative brake systems may moreover be used also in vehicles, which are operated by fuel cells and in which electrical energy likewise has to be provided for reformation processes or the like.

In such regenerative brake systems, the generator in a braking situation, i.e. upon a brake pedal actuation, is driven at least via the driven wheels. The energy required for this purpose is used to decelerate the vehicle. If however this deceleration is not sufficient to brake the vehicle in accordance with the braking request of the driver, then, as in conventional brake systems, a brake force has to be additionally generated by means of the brake system. Given the use of the brake force generator 10b according to the invention in such a regenerative brake system, the problem however arises that the brake force generator 10b, upon a brake pedal actuation and a resultant displacement of the force input element 14b, initially does not have to generate any brake force. Brake force generation by the brake force generator 10b is for example not required so long as the deceleration achievable by the connected generator is sufficient for the setpoint deceleration defined by the driver request. It is only if this condition is no longer met that the brake force generator 10b has to generate an additional brake force. This means that activation of the actuator 48b and subsequent activation of the control valve 22b in the manner described above with reference to FIG. 3 and the following is only necessary when a pure generator braking operation is no longer sufficient. Before such an activation of the control valve and a resulting brake force generation occurs, a displacement of the force input element 14*b* is transmitted merely via the coupling element 56*b*, the transmission piston 52*b* and the separating piston 72*b* to the pedal counterforce simulating device, which opposes the pedal actuation with a resistance force familiar to the driver. Since initially no displacement of the armature 50*b* inside the coil 46*b* is to occur but the coupling element 56*b* moves because of the movement of the force input element 14*b* in FIG. 8 to the left, the safety clearance s is to be dimensioned large enough to rule out an unwanted mechanical coupling of coupling element 56*b* and armature 50*b*.

The clamping sleeve 174*b* is necessary because otherwise the actuating piston 68*b* might be displaced under the action of the coupling element 56*b*, the transmission piston 52*b* and the separating piston 72*b* inside the primary piston 64*b* into the primary pressure chamber 132*b* and hence might generate brake pressure in the primary pressure chamber 132*b*, this being undesirable during this phase of the braking operation.

Following the pure generator braking operation, there must then be a smooth transition to a state, in which braking is effected both by means of the generator and by means of the brake force generated by the brake force generator 10*b*. To make this transition as jolt-free as possible, the brake force generator 10*b* according to the invention may be moved in advance into a stand-by position, in which all of the idle motions of the arrangement have already been used up.

Otherwise, the brake force generator 10*b* according to the invention operates in the manner described above with reference to FIGS. 1 to 6. This applies equally to the discussed emergency operating situations, which are also to include a failure of the generator.

In an alternative application of the brake force generators 10 and 10*b*, during a braking operation from the outset in addition to the generator braking operation the brake force generator is also activated. The deceleration effect of the generator braking operation is in said case taken into account in the pedal actuation-brake force generation characteristic curve of the control circuit of the brake force generator. The effect achievable thereby is that a transition, which is occasionally perceivable by the driver, from a pure generator braking operation to a combined generator- and brake system braking operation is prevented. Such a chronologically parallel implementation of generator- and brake system braking may be effected for example in that the generator decelerates the wheels of the one vehicle axle and the brake system initially decelerates only the wheels of the other vehicle axle until the brake system finally—from a specific deceleration limit value defined by the pedal actuation onwards—acts on and decelerates all four wheels of the vehicle.

Figure 9:
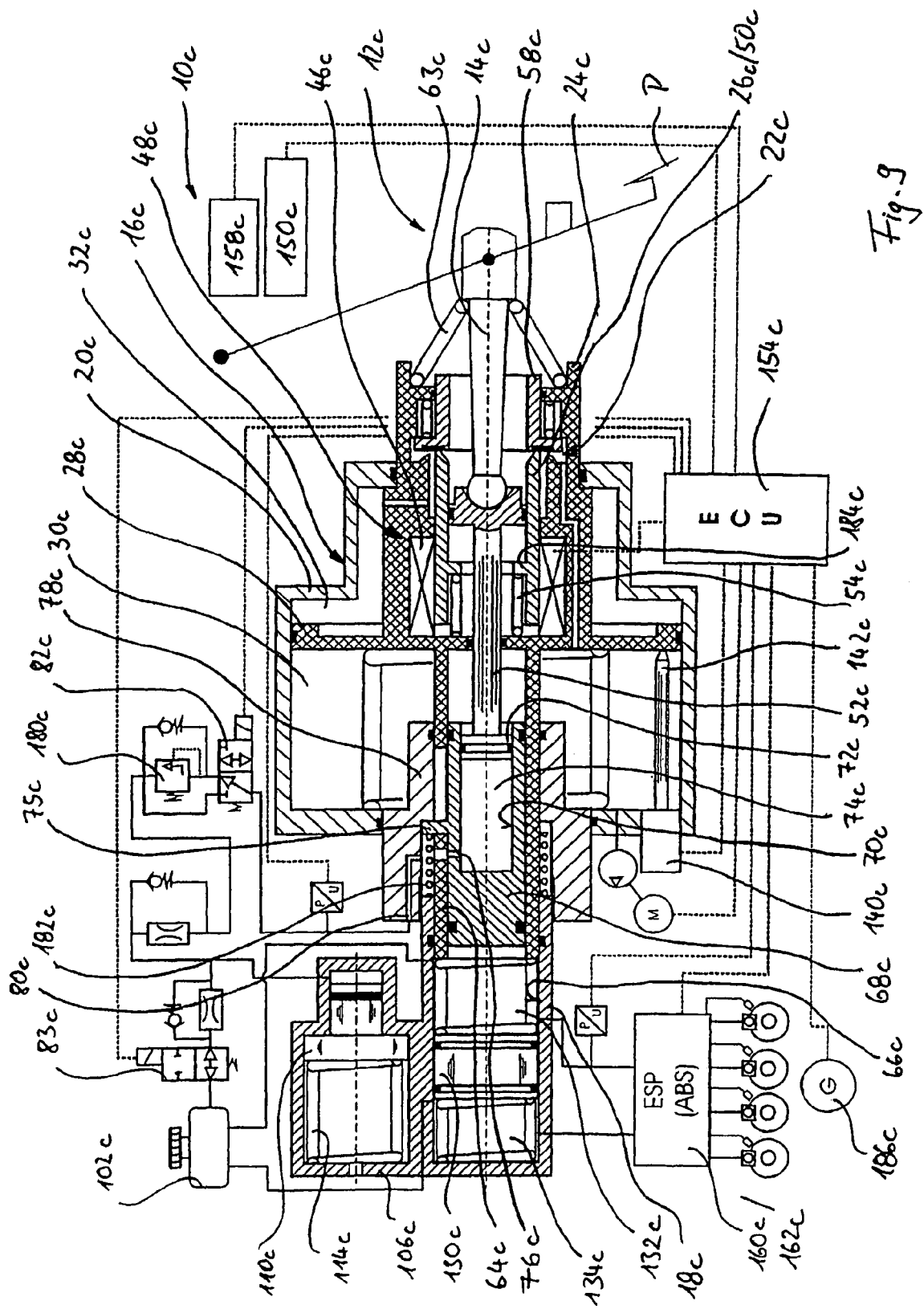

FIG. 9 shows a further embodiment of the brake force generator according to the invention. To avoid repetition, once again only the differences from the embodiments according to FIGS. 3 and 4 as well as 8 are described, wherein for components of an identical type or function once again the same reference characters as before in the description of FIGS. 3 and 4 as well as 8 are used, but with the letter "c" appended.

The embodiment according to FIG. 9 differs from the embodiment according to FIG. 3 substantially in the following aspects:

Unlike the previously discussed embodiments, the embodiment shown diagrammatically in FIG. 9 for the sake of simplified representation is constructed not with a tandem chamber arrangement but with only one movable wall 28*c*.

A further important difference of the embodiment according to FIG. 9 from the previously described embodiment according to FIG. 8 is that the stop pin 75*c* is not fixed by a clamping sleeve (for example 174*b*) relative to the cylinder housing 18*c* and so a movement of the actuating piston 68*c* relative to the cylinder housing 18*c* is blocked. Rather, in the embodiment according to FIG. 9 the actuating piston 68*c* is supported by means of the stop pin 75*c* via a spring element 182*c* against the cylinder housing 18*c* under spring bias in FIG. 9 to the left and rests via the stop pin 75*c* against a diameter step in the closure sleeve 78*c*. By virtue of providing the spring element 182*c*, it is possible to omit the safety clearance s, which is provided in the previously described embodiments and has to be overcome in the described emergency operating situations before the pedal actuating force summoned up by the driver of a vehicle is mechanically transmitted to the brake system in order to generate a brake force.

FIG. 9 moreover diagrammatically shows a generator that may be used for the generator braking operation.

The brake system shown diagrammatically in FIG. 9 operates as follows:

During a first phase of a braking operation, in which a generator braking operation is to be effected, the vacuum brake force generator 10*c* as well as the connected master cylinder inside the cylinder housing 18*c* initially remain passive. Upon an actuation of the brake pedal P, the movement of the force input element 14*c* is transmitted via the transmission piston 52*c* and the separating piston 72*c* with simultaneous conveying of the previously described hydraulic system to the pedal counterforce simulation device 106, which provides a counterforce familiar to the driver. In said case, the block valve 82*c* is switched by active control into its open position, so that it allows the hydraulic fluid to flow through unimpeded. A further block valve 83*c* is activated in such a way that it separates the reservoir 102*c* from the remaining hydraulic circuit.

The spring element 182*c* is so designed that in such an operating situation it prevents a movement of the actuating piston 68*c* and holds the actuating piston 68*c* in the position shown in FIG. 9. In this way, a build-up of brake pressure in the primary pressure chamber 132*c* and in the secondary pressure chamber 134*c* may be prevented in each case.

During a second phase of the braking operation, in which a pure generator braking operation is no longer sufficient to achieve the desired deceleration of the vehicle, brake pressure has to be additionally built up by means of the primary piston 64*c* and the secondary piston 130*c* in the primary pressure chamber 132*c* and in the secondary pressure chamber 134*c*. This is achieved in that the electronic control unit 154*c* additionally activates the actuator 48*c*, so that the control valve 22*c* may be opened and the brake force generator 10*c* may therefore be additionally activated. This second phase of the braking operation is characterized in that both the braking effect of the generator and the braking effect of the friction brake units activated by the brake pressure are utilized to achieve the desired deceleration of the vehicle.

In a braking situation, in which the brake system is not operating properly, for example because of failure of the power supply in the vehicle, the following occurs: in the absence of the power supply, the two block valves 82*c* and 83*c* remain in their passive positions shown in FIG. 9. In these positions, the hydraulic fluid has to flow through a pressure control valve 180*c* before it is able to flow into the reservoir 102c, simultaneously bypassing the pedal counterforce simulating device 106c. In said case, the pressure control valve 180c is designed such that it opens only from a specific minimum pressure on. The effect achievable thereby is that the hydraulic fluid is initially unable to flow out of the hydraulic chamber 74c, so that the movement of the force input element 14c is transmitted via the transmission piston 52c directly to the actuating piston 68c and from there via the stop pin 75c to the primary piston 64c. The effect achievable thereby is that, without a safety clearance having to be overcome, the movement of the force input element 14c is used directly for brake force generation. In said case, the spring element 182c is compressed. As soon as the hydraulic pressure in the hydraulic chamber 74c exceeds the minimum pressure of the pressure control valve 180c, the pressure control valve 180c opens and allows hydraulic fluid to flow out of the hydraulic chamber 74c. Consequently, the separating piston 72c and the transmission piston 52c engage further into the actuating piston 68c. The result is therefore also a relative movement between the, in FIG. 9, right end of the transmission piston 52c and the valve sleeve 26c. Given sufficiently intensive pedal actuation, the large-diameter right end of the transmission piston 52c is finally laid against the stop shoulder 184c provided integrally on the valve sleeve 26c, so that the valve sleeve 26c is directly connected workingly to the transmission piston 52c. Each further movement of the transmission piston 52c is consequently transmitted directly to the valve sleeve 26c. Thus, the control valve 22c may be opened and the pressure difference—if one still exists—between the vacuum chamber 30c and the working chamber 32c may be used, despite the power failure, to boost the brake force generation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Brake force generator for a vehicle hydraulic brake system having
a force input element, which is connectable or connected to a brake pedal and displaceable in a base housing of the brake force generator,
a master cylinder having a cylinder housing, in which a primary piston is displaceably guided, wherein the primary piston with the master cylinder delimits a primary pressure chamber for generating a hydraulic brake pressure,
a pedal counterforce simulating device,
a pedal actuation detecting device for detecting a pedal actuation and
an actuating force generating device for exerting an actuating force on the primary piston,
wherein the actuating force generating device comprises a control valve, a chamber arrangement and an electromagnetic actuator, wherein the chamber arrangement is designed with a vacuum chamber and a working chamber, which is separated from the vacuum chamber by a movable wall and is fluidically connectable to the vacuum chamber by the control valve, and wherein the control valve in accordance with the detected pedal actuation may be activated by the electromagnetic actuator in order to achieve a pressure difference between working chamber and vacuum chamber that determines the actuating force
wherein the pedal counterforce simulating device is workingly connectable to the force input element by a pedal counterforce hydraulic system, which comprises a pedal counterforce simulating device wherein the pedal counterforce simulating device is integrated in the cylinder housing or provided as a separate module thereon.

2. Brake force generator according to claim 1, wherein the force input element is connected by a transmission piston arrangement to the pedal counterforce simulating device.

3. Brake force generator according to claim 2, wherein the primary piston is provided with a through-bore, in which an actuating piston is guided, wherein the actuating piston has an actuating cylinder bore, in which a separating piston is guided and is displaceable by means of the transmission piston arrangement, wherein the separating piston in the actuating piston delimits a hydraulic fluid chamber that is fluidically connected to the hydraulic system of the pedal counterforce simulating device.

4. Brake force generator according to claim 3, wherein the actuating piston is displaceable relative to the cylinder housing.

5. Brake force generator according to claim 4, wherein the actuating piston is displaceable counter to the action of a spring element relative to the cylinder housing.

6. Brake force generator according to claim 5, wherein a stop pin provided on the actuating piston is used to connect the actuating piston and the spring element.

7. Brake force generator according to claim 3, wherein a component of the transmission piston arrangement that contacts the separating piston is releasably connected to the separating piston by means of one of magnetically, adhesively, and latching.

8. Brake force generator according to claim 3, wherein the actuating piston is fixed relative to the cylinder housing.

9. Brake force generator according to claim 1, characterized by an electronic control device, which monitors the pedal actuation detecting device and activates the electromagnetic actuator in accordance with an output signal of the pedal actuation detecting device, preferably with due regard to a defined characteristic curve or a defined family of characteristics.

10. Brake force generator according to claim 9, wherein the electronic control device is connected to the electromagnetic actuator and activates said actuator in accordance with a hydraulic pressure that is detected in the hydraulic system of the pedal counterforce simulating device, for example at the block valve.

11. Brake force generator according to claim 10, wherein the electronic control device is connected to the electromagnetic actuator and activates said actuator in accordance with a parameter determined by a vehicle control system, such as for example the distance from a vehicle travelling in front, the present hydraulic pressure in the brake system, the actual deceleration, or the like.

12. Brake force generator according to claim 9, wherein the electronic control device is connected to the electromagnetic actuator and activates said actuator in accordance with one of a time rate of change of the output signal of the pedal actuation detecting device and the hydraulic pressure detected in the hydraulic system of the pedal counterforce simulating device, for example at the block valve.

13. Brake force generator according to claim 9, wherein the characteristic curve or the family of characteristics is permanently defined or adaptable to detected operating parameters.

14. Brake force generator according to claim 9, wherein the electronic control device is connected to the block valve and activates said block valve in accordance with an output signal of the pedal actuation detecting device.

15. Brake force generator according to claim 9, wherein the electronic control device is connected to the electromagnetic actuator and, when activating the electromagnetic actuator, takes into account an output signal of a position sensor.

16. Brake force generator according to claim 1, wherein the pedal counterforce hydraulic system is designed with a controllable block valve, which in a passive position, uncouples the damper arrangement and the transmission piston arrangement hydraulically from one another and allows a substantially undamped movement of the transmission piston arrangement and which in an active position, connects the damper arrangement and the transmission piston arrangement hydraulically to one another.

17. Brake force generator according to claim 16, wherein the block valve is provided with a throttle element, preferably with a spring-biased restrictor, which in the active position of the block valve throttles a hydraulic fluid flow to the damper arrangement.

18. Brake force generator according to claim 16, wherein the block valve at the start of a brake pedal actuation is switched from its passive position to its active position and the control circuit is not switched from its active position to its passive position until after completion of the brake pedal actuation.

19. Brake force generator according to claim 1, wherein in the master cylinder a secondary piston is displaceably guided, that the secondary piston with the master cylinder encloses a secondary pressure chamber for generating a hydraulic brake pressure, and that the primary piston with the master cylinder and the secondary piston encloses the primary pressure chamber for generating a hydraulic brake pressure.

20. Brake force generator according to claim 19, wherein the primary piston and optionally the secondary piston are biased in each case into a basic position by means of biasing springs associated therewith.

21. Brake force generator according to claim 1, wherein the chamber arrangement is designed as a tandem chamber arrangement comprising a first chamber arrangement and a second chamber arrangement separate from the first, wherein the first chamber arrangement comprises a first vacuum chamber and a first working chamber separated by a first movable wall from the first vacuum chamber, wherein moreover the second chamber arrangement comprises a second vacuum chamber and a second working chamber separated by a second movable wall from the second vacuum chamber, wherein the first and second chamber arrangement may be pressurized by means of the control valve.

22. Brake force generator according to claim 21, wherein the first movable wall and the second movable wall for the purpose of joint movement are connected, preferably rigidly, to one another.

23. Brake force generator according to claim 1, wherein the control valve comprises a control valve housing displaceable relative to the base housing as well as a control valve element displaceable relative to the control valve housing, wherein on the control valve housing a housing sealing seat movable into sealing abutment with the control valve element is provided, wherein a control valve sleeve, on which a sleeve sealing seat movable into sealing abutment with the control valve element is provided, is further coupled to the electromagnetic actuator.

24. Brake force generator according to claim 23, wherein, given sealing abutment of control valve element and sleeve sealing seat and simultaneously mutually separate control valve element and housing sealing seat, the working chamber is fluidically connected to the vacuum chamber and that, given sealing abutment of control valve element and housing sealing seat and simultaneously mutually separate control valve element and sleeve sealing seat, for building up a pressure difference between working chamber and vacuum chamber the working chamber is fluidically connected to the ambient atmosphere.

25. Brake force generator according to claim 1, wherein the master cylinder is formed in the cylinder housing in the form of a cylinder bore open at one end.

26. Brake force generator according to claim 25, wherein the cylinder housing together with the components disposed therein is insertable as a module into the base housing and releasably connected thereto.

27. Brake system for a motor vehicle having a brake force generator according to claim 1.

28. Brake system according to claim 27, wherein the motor vehicle is designed with a generator used for deceleration and that the vehicle deceleration achieved upon activation of the generator is taken into account when activating the brake force generator.

29. Brake force generator according to claim 1, wherein the present position of the movable wall, is detected by means of a position sensor.

30. Brake force generator according to claim 1, wherein the pedal actuation detecting device comprises a sensor for detecting an actual deflection of the brake pedal, in particular an angle-of-rotation sensor disposed at an axis of rotation of the brake pedal.

31. Brake force generator according to claim 1, wherein the vacuum chamber for generating a vacuum is fluidically connected to the intake tract of an internal combustion engine or to a vacuum pump.

32. Brake force generator according to claim 1, wherein the damper arrangement comprises a simulation spring, which is compressible by means of a force piston displaceable by means of one of the pedal counterforce hydraulic system and fluid damping means.

33. Brake force generator according to claim 1, wherein the electromagnetic actuator comprises a coil fastened to the control valve housing as well as a magnetic armature displaceable by means of the coil relative to the coil.

34. Brake force generator according to claim 33 wherein between the force input element and a component that actuates the control valve, in particular the armature, a safety clearance is provided that, in the absence of displacement of the armature by the coil despite actuation of the brake pedal, is overcome so that the component that actuates the control valve, in particular the armature, is workingly connectable to the force input element, wherein a further displacement of the force input element that is induced by a brake pedal actuation is transmitted directly to the component that actuates the control valve, in particular the armature, and hence to the control valve housing.

* * * * *